United States Patent
Lo et al.

(10) Patent No.: US 9,436,258 B1
(45) Date of Patent: Sep. 6, 2016

(54) DYNAMIC SERVICE LEVEL OBJECTIVE POWER CONTROL IN DISTRIBUTED PROCESS

(71) Applicant: Google Inc., Mountain View, CA (US)

(72) Inventors: David Lo, Stanford, CA (US); Liqun Cheng, San Jose, CA (US); Rama Krishna Govindaraju, San Jose, CA (US)

(73) Assignee: Google Inc., Mountain View, CA (US)

( * ) Notice: Subject to any disclaimer, the term of this patent is extended or adjusted under 35 U.S.C. 154(b) by 247 days.

(21) Appl. No.: 14/219,404

(22) Filed: Mar. 19, 2014

Related U.S. Application Data (60) Provisional application No. 61/907,348, filed on Nov. 21, 2013.

(51) Int. Cl.
  *G06F 1/32* (2006.01)
  *H04L 12/26* (2006.01)
  *G06F 9/48* (2006.01)

(52) U.S. Cl.
  CPC ........... *G06F 1/3206* (2013.01); *G06F 1/3234* (2013.01); *G06F 9/4893* (2013.01); *H04L 43/04* (2013.01)

(58) Field of Classification Search
  CPC .......... G06F 1/26; G06F 1/32; G06F 1/3206; G06F 1/3234; G06F 9/4893
  USPC ........................... 713/300, 320; 718/100, 104
  See application file for complete search history.

(56) References Cited

U.S. PATENT DOCUMENTS

| | | | | |
|---|---|---|---|---|
| 6,829,713 B2 * | 12/2004 | Cooper | ................. | G06F 1/3203 713/320 |
| 8,001,403 B2 * | 8/2011 | Hamilton | ............... | G06F 1/3203 713/300 |
| 8,447,993 B2 * | 5/2013 | Greene | .............. | G06Q 30/0283 700/291 |
| 8,489,904 B2 * | 7/2013 | Boyd | .................... | G06F 1/3203 713/320 |
| 9,183,144 B2 * | 11/2015 | Wang | ................... | G06F 12/0811 |
| 2014/0298349 A1 * | 10/2014 | Jackson | ................. | G06Q 10/06 718/104 |
| 2015/0089249 A1 * | 3/2015 | Hannon | ................ | G06F 1/3206 713/300 |

OTHER PUBLICATIONS

Anagnostopoulou, et al., "SLA-guided energy savings for enterprise servers," Performance Analysis of Systems and Software (ISPASS), 2012 IEEE International Symposium on , vol., No., pp. 120-121, Apr. 2012.

Wang et al., "Virtualizing power distribution in datacenters," Proceedings of the 40th Annual International Symposium on Computer Architecture (ISCA '13). ACM, New York, NY, USA, 595-606.

* cited by examiner

*Primary Examiner* — Chun Cao
(74) *Attorney, Agent, or Firm* — Fish & Richardson P.C.

(57) ABSTRACT

Methods, systems, and apparatus for dynamic service level objective power control in a datacenter. In one aspect, a method includes determining a current service level value that measures a current performance of the service by a set of processing devices performing the service, the service having an associated service level objective value; and for each processing device: when the current service level value does not meet the service level objective value of the service, generating a first control signal that causes a processing device performing the service to operate at a first power consumption level; and when the current service level value does meet the service level objective value of the service, generating a control signal that cause the processing device to operate at a reduced power consumption level that is less than the first power consumption level.

19 Claims, 6 Drawing Sheets

DYNAMIC SERVICE LEVEL OBJECTIVE POWER CONTROL IN DISTRIBUTED PROCESS

CROSS-REFERENCE TO RELATED APPLICATIONS

This application claims the benefit of priory of U.S. Application Ser. No. 61/907,348, filed on Nov. 21, 2013, the entire disclosure of which is incorporated herein by reference.

TECHNICAL FIELD

This document relates to resource management in data centers.

BACKGROUND

Data centers are often used by service providers to deliver Internet based services to users. A data center, such as a server farm, typically contains hundreds or thousands of processing devices. Within the data centers the processing devices are arranged (or grouped) in clusters. Each cluster is configured to perform a distributed task in a parallel or pipelined fashion. Clusters may be logically or physically defined.

Because there are typically many thousands of processing devices in a data center, the data centers have large energy requirements. These requirements are often on the order of megawatts. The energy consumption of a data center contributes a significant fraction to the total operational costs of running the data center.

SUMMARY

In general, one innovative aspect of the subject matter described in this specification can be embodied in methods that include the actions of: for each of a plurality of services that are each distributively implemented in a respective set of processing devices, each service having a respectively associated service level objective value for the service, the service level objective value being a required quality of service to be met by the set of processing devices performing the service: determining a current service level value that measures a current performance of the service by the set of processing devices performing the service; for each service for which the current service level value does not meet the service level objective value of the service, generating a first control signal that causes one or more of the processing devices performing the service to operate at a first power consumption level; and for each service for which the current service level value does meet the service level objective value of the service, generating one or more control signals that cause one or more processing devices performing the service to operate at one or more reduced power consumption levels that are each less than the first power consumption level and wherein the one or more reduced power consumption levels causes a difference between the current service level value of the set of processing devices performing the service and the service level objective value for the service to decrease. Other embodiments of this aspect include corresponding systems, apparatus, and computer programs, configured to perform the actions of the methods, encoded on computer storage devices. The systems, methods and apparatus are dynamic and adaptive.

Another innovative aspect of the subject matter described in this specification can be embodied in methods that include the actions of: for a service that is distributively implemented in a set of processing devices, the service having a respectively associated service level objective value, the service level objective value being a required quality of service to be met by the set of processing devices performing the service: determining a current service level value that measures a current performance of the service by the set of processing devices performing the service; when the current service level value does not meet the service level objective value of the service, generating a first control signal that causes one or more of the processing devices performing the service to operate at a first power consumption level; and when the current service level value does meet the service level objective value of the service, generating one or more control signals that cause one or more processing devices performing the service to operate at one or more reduced power consumption levels that are each less than the first power consumption level and wherein the one or more reduced power consumption levels causes a difference between the current service level value of the set of processing devices performing the service and the service level objective value for the service to decrease. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Scaling back of performance of processing devices that are operating at a performance level at which they are exceeding a service level objective allows for energy cost savings without noticeably impacting the user experience. A dynamic and adaptive feedback approach based on system factors in a service level agreement, such as the service level objective, ensures that adjustments made do not preclude meeting the service level objective while still reducing energy consumption. Furthermore, the feedback approach can be implemented to respond relatively quickly in response to a detected performance level of a cluster of processing devices, ensuring that power setting changes are responsive to near instantaneous demand curves. Additionally, power saved from one service can be used to increase performance of processing devices that are performing another service at a performance level that does not meet the service level objective for that service. This results in a highly efficient use of power resources to achieve service level objectives in a data center, which can, for example, delay or obviate a data center expansion for additional processing capability or reduce the operational cost.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A dynamic performance monitoring control system that controls the performance level of a set of processing devices performing a service based on a service level objective value for the service and a current service level value that measures a current performance of the service by the set of processing devices. The service level objective value defines a required quality of service to be met by the set of processing devices performing the service.

The service level objective may be a minimum constraint, such as a minimum number of data records to be processed per unit time, or maximum constraint, such as a maximum latency for an operation. When the service level objective is a maximum constraint, it is met when the current service level value of a processing device is less than or equal to the service level objective value. Conversely, when the service level objective is a minimum constraint, it is met when the current service level value of a processing device is greater than or equal to the service level objective value. More generally, any constraint metric can be chosen by the application or the service provider.

For each service for which the current service level value does not meet the service level objective value of the service, the system generates a first control signal that causes one or more of the processing devices performing the service to operate at a first power consumption level. The first power consumption level may be a maximum power level, for example.

For each service for which the current service level value does meet the service level objective value of the service, the system generates one or more control signals that cause one or more processing devices performing the service to operate at one or more reduced power consumption levels. The reduced power consumption levels are less than the first power consumption level. This results in the difference between the current service level value of the set of processing devices performing the service and the service level objective value for the service to decrease. Accordingly, power consumption for a service is decreased, but the service level objective is still met.

The dynamic control process can be implemented at a global level for a set of process devices, or at a per-processor level in which power for each processing device is controlled, or both. More generally, the systems and methods described below can partition any constraint metric to constituent metrics for each constituent part of a system, down to a per-device level. At the per-device level, the service level objective can define constituent service level objective values that each defines a constituent quality of service to be met by a processing device performing a distributed portion of the service. For example, assume a latency requirement for processing a set of data records by a set of processing devices is 50 milliseconds. The processing devices include a root node and leaf nodes, and the root node distributes proper subsets of the set of data records to the leaf nodes for processing. The leaf nodes, in turn, process the records and return the processed records to the root node for aggregation and return to the user. The constituent service level objectives may be, for example, 15 milliseconds at the root node to sort and distribute the data records, 25 milliseconds at each processing node to process and return the data records, and 10 milliseconds at the root node to aggregate and return the processed data records. The performance of the root node processing device and each leaf node processing device for each sub-operation of the service can be monitored, and power for each node can be dynamically adjusted to conserver power while still meeting respective service level objectives.

These features and other features are described in more detail below. Additionally, in the examples described below, a set of processing devices perform one service. However, a set of processing devices may perform more than one service, and the performance of each respective service may be monitored. Power can be adjusted based on the poorest performing service level so that power savings can still be achieved. Thus, the systems and methods described below can be implemented in a cluster of computers that perform multiple services simultaneously.

Figure 1:
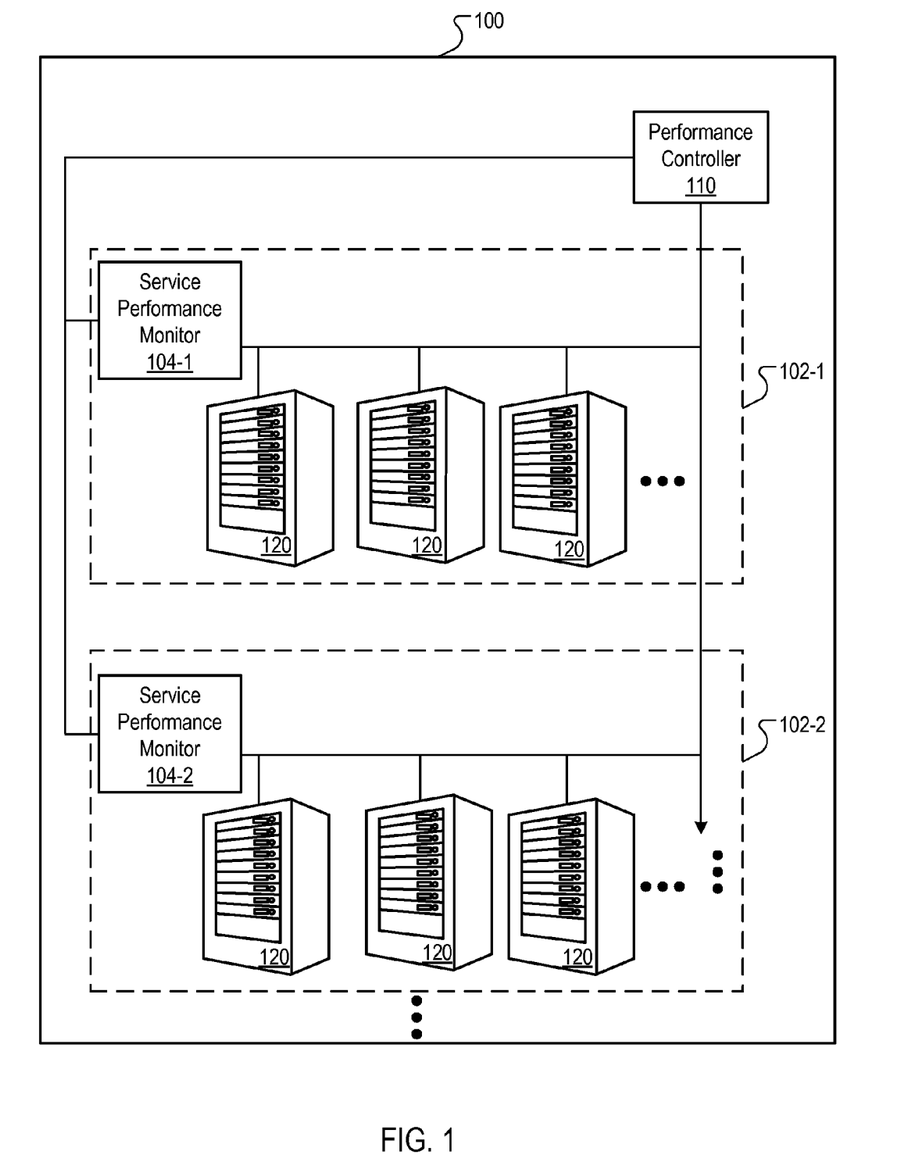
FIG. 1 is an illustration of a data center having sets of processing devices that are performing respective services.

FIG. 1 is an illustration of a data center 100 having sets of processing devices 102 that are performing respective services. The data center 100 can occupy one or more rooms within a building or essentially an entire building. The data center 100 is sufficiently large for installation of numerous (e.g., dozens or hundreds or thousands) of processing devices. The processing devices are typically arranged in racks 120 of computer equipment.

Each rack 120 includes multiple processing devices. In general, each processing device includes a motherboard, on which a variety of computer-related components are mounted. The racks 120 are in data communication and the processing devices located within can be in data communication with other processing devices.

The processing devices 100 are configured in sets 102 (or "clusters"), and each set of processing devices performs a service. The service is distributed implemented among the processing devices, as will be described in more detail with respect to FIG. 2 below. Each set 102 is either logically or physically configured to distributively implement a service. Although sets and clusters are described, the domain of a service need not be limited to one set or cluster, and thus the systems and methods described below can be applied for a service implemented across multiple clusters.

A service can be any data processing operation the data center 100 facilitates. For example, each of the following are a service: processing of a search query to score resources and return the scores for the resources; processing of search query logs to identify trending queries; processing of data records in a map reduce operation; and so on. Each service has a service level objective value that defines a required quality of service to be met by the set of processing devices performing the service. The service level objective may be a minimum constraint, such as a minimum number of data recorders to be processed per unit time, or maximum constraint, such as a maximum latency for an operation.

For each service, a service performance monitor 104 receives reporting data from processors performing the service. The data includes performance metric values, such as queue lengths, node level latencies, including, for example, average and tail latencies, power levels, etc. The service performance monitor 104 coordinates with a performance controller 110 for adjustments on a per-service level in each set of processing devices 102. In some implementations, the service performance monitor 104 communicates with a node controller 204 in each processing device to facilitate power level adjustments on a per-device basis. These features are described in more detail with reference to FIG. 2, which is a block diagram of a dynamic performance controller for a set of server processing devices 202 performing a service in a data center.

Figure 2:
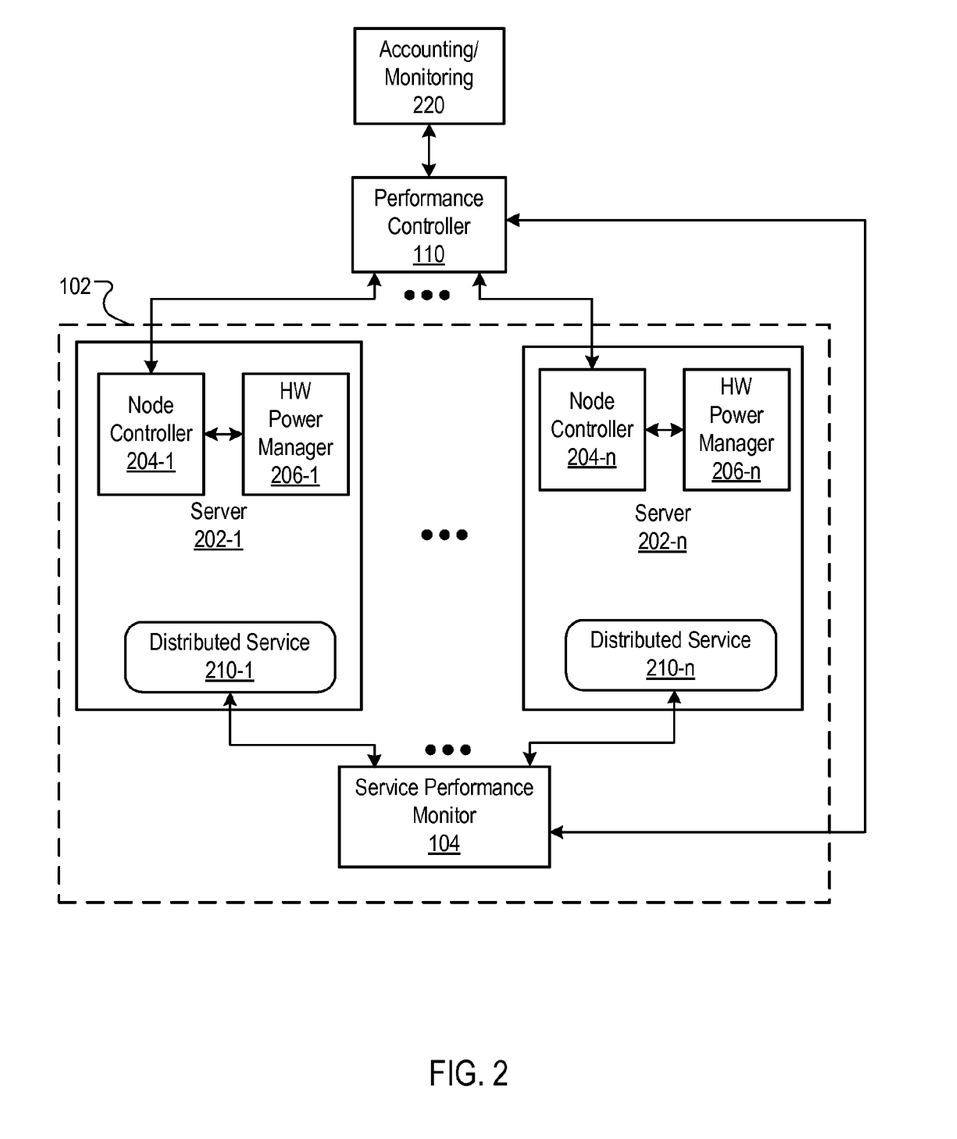
FIG. 2 is a block diagram of a dynamic performance controller for a set of processing devices performing a service in a data center.

Each server 202 in FIG. 2 includes a node controller 204 and a hardware power manager 206. Furthermore, each server 202 performs a distributed service 210 portion of an overall service provided by the set of processing devices 102.

The node controller 204 in each node communicates with the hardware power manager 206 to receive power status reporting data and other data and to set various power levels, frequency levels, voltage levels, etc., as determined by the node controller 204. Examples of such settings include CPU package thermal power capping, dynamic voltage and frequency scaling, and frequency modulation.

The performance controller 110 can communicate to the node controllers 204 constituent service level objectives and allows the node controllers to manage the power settings in their respective servers 202. The performance controller 110 can thus facilitate overall coordination of the node controllers 204 in the servers 202 and provide adjustments that may be needed at the global level. Alternatively, the performance controller 110 can retain control of the power settings of some or all of the individual servers 202 in the in the set 102.

In some implementations, the node controllers 204 can be omitted, and the performance controller 110 can directly control the power settings in each server 202. However, inclusion of the node controllers 204 can ensure that power management can still be implemented in the event of a failure of the performance controller 110. For example, the node controllers 204 can be configured to manage power in their respective servers 202 according to their respective constituent service level objectives in the event communication with the performance controller 110 is lost. In particular, the node controllers 204 are configured to be resilient to failure of the performance controller 110. For example, the node controllers 204 can re-connect to backup performance controllers 110 or operate independently through either fallback to default modes or ensuring that the constituent service level objectives are well within operating limits.

To illustrate how each node controller 204 may adjust a power level in a server 202, assume that the performance controller receives a service level objective value defining an average latency of 100 milliseconds, and further determines, based on monitor performance of the servers over time, that the service level objective is met when each server 202 has a constituent service level objective value of 5 milliseconds. The performance controller 110 provides the constituent service level objective value to each node controller 202. Assume that three servers 202 are operating at the following latencies: 1 millisecond, 3 milliseconds and 5 milliseconds. In such a situation, the service level latency is dominated by the slowest server operating at 5 milliseconds. Thus the performance controller 110 allows the node controllers 204 in the other two servers operate at lower energy consumption to increase their respective latencies without affective overall service performance.

The performance controller 110 can, in some implementations, communicate with an accounting and power monitoring system 220 to store energy savings realized and other logging and bookkeeping activities.

Figure 3:
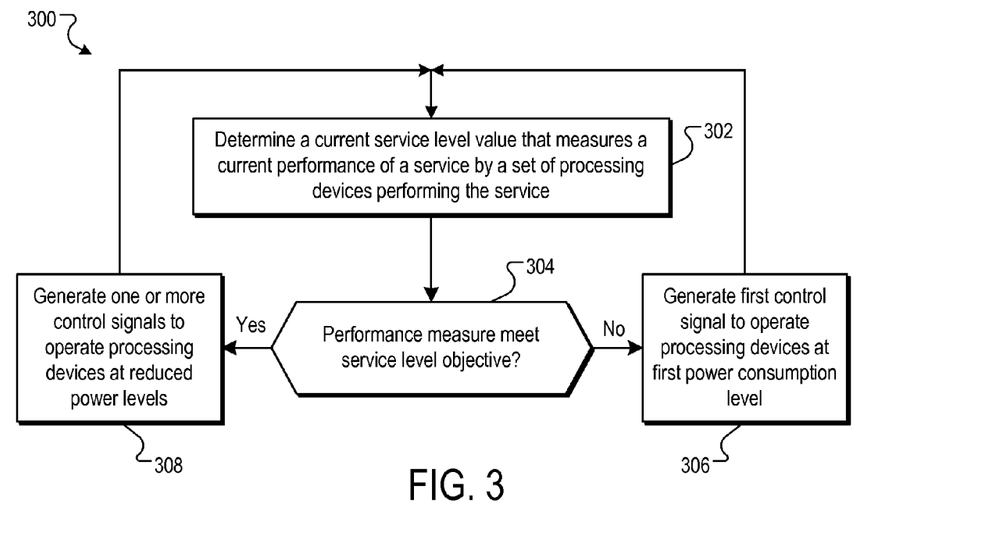
FIG. 3 is a flow diagram of an example process for providing dynamic performance control of processing devices performing a service in a data center.

FIG. 3 is a flow diagram of an example process 300 for providing dynamic performance control of processing devices performing a service in a data center. The process is implemented in the performance controller 110, or distributively implemented in node controllers 204 and the performance controller 110.

The process 300 determines a current service level value that measures a current performance of a service by a set of processing devices performing the service (302). For example, each node controller 204 receives the current service level value from the performance controller 110, which receives the value from the service performance monitor. Alternatively, each node controller 204 receives the current service level value directly from the service performance monitor 104. The current service level value can be an instantaneous value (e.g., a single sample), or can be a central tendency (e.g., an average or median of a number of samples).

The process 300 determines whether the performance measure meets the service level objective (304). The determination may be made, for example, on a comparison of the current service level value to the service level objective value. The comparison may be a straight comparison, or may incorporate a "soft limit" by which the service level objective value is scaled so as to ensure service level headroom. For example, assume the service level objective value is a latency of 100 millisecond; a soft limit may be 90% of the service level objective value, or 90 milliseconds. Example of various limits and headroom considerations are described with reference to FIG. 4 below.

If the performance measure does not meet the service level objective, then the process 300 generates a first control signal to operate processing devices at first power consumption level (306). For example, the first control signal causes a processing device to operate at a first power consumption, which is a maximum power level.

Conversely, if the performance measure meets the service level objective, then the process 300 generates one or more control signals to operate the processing devices at reduced power levels (308). In some implementations, to generate the control signal, the performance controller 110 (or the node controller 204) determines a difference between the current service level value and the service level objective value. Based on this difference, the performance controller 110 (or the node controller 204) generates a control signal that causes a power consumption level in a processing device to be reduced in proportion to difference.

In other implementations, the control signal may cause the power consumption in the processing device to be set between a minimum power level and a maximum power level by a series of power adjustment steps. One such example implementation is described with reference to FIGS. 4 and 5 below.

After step 304 or 306, the process 300 returns to step 302 to again determine the current service level value. By doing so, the process 300 incorporates a self-correcting feedback loop that tends to reduce power consumption during low load conditions and/or when the current service level meets or exceeds the service level objective by a sufficient amount.

Figure 4:
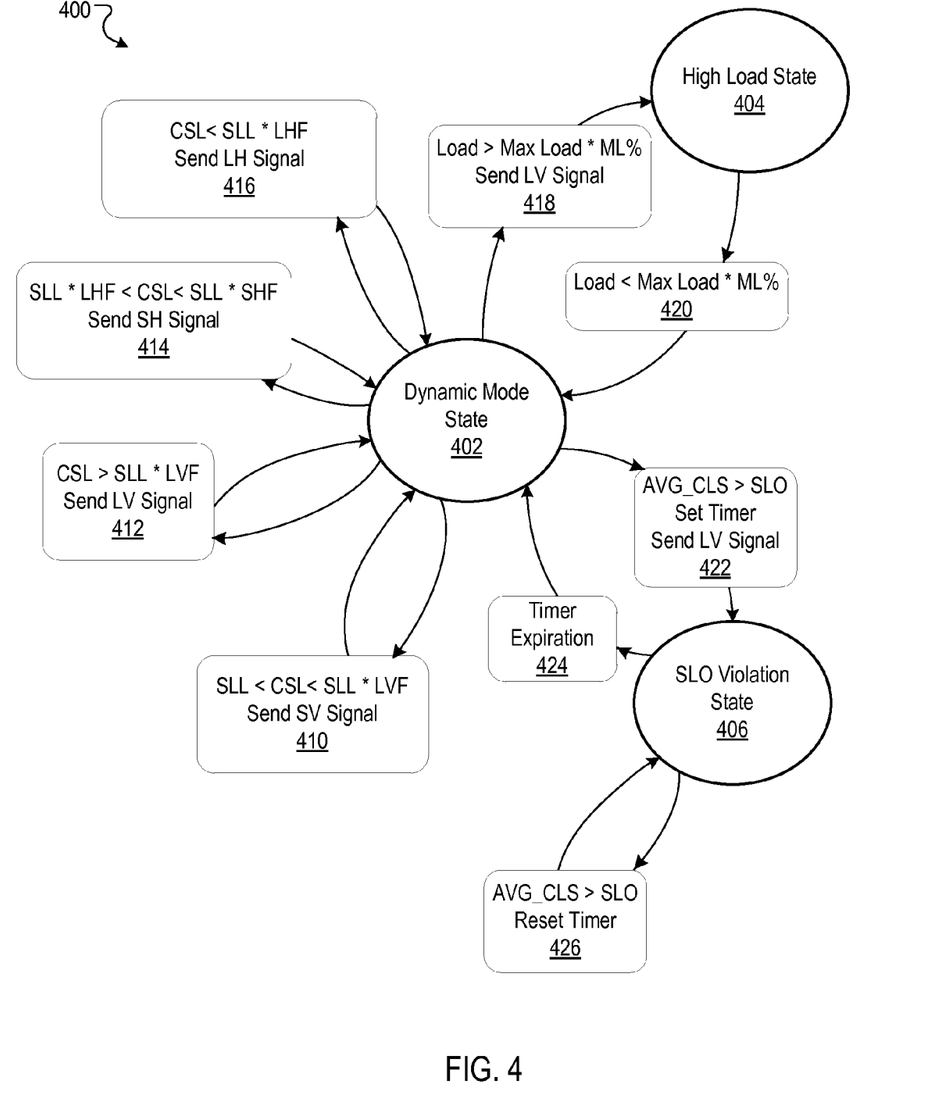
FIG. 4 is a state diagram illustrating an example process for monitoring a current service level performance and control signals generated in response.

FIG. 4 is a state diagram 400 illustrating an example process for monitoring a current service level performance and control signals generated in response. One or more devices, such as the performance controller 110 or each node controller 204, can be programmed to act according to the state diagram 400.

In the dynamic mode state 402, the device monitors the current service level and load level of a server and, depending on the conditions met, transitions to a high load state 404 or a service level objective violation state 406.

From data received from the hardware power manager 206 and the service performance monitor 104, a device determines the current service level of a server. The current service level (CSL) is then compared to the service level objective (SLO). The comparison may involve one more thresholding checks. For example, a soft level limit (SLL) may be derived from the service level objective. The soft level limit may be a percentage of the service level objective. In particular, if the service level objective is a maximum value, the soft level limit is a value that is less than 100%, e.g., 90%, or SLL=0.9*SLO. The soft level limit ensures that there is minimum headroom for periodic workload spikes.

Headroom factors are additional thresholding limits that can be used. For example, two headroom factors—a small headroom factor (SHF) and a large headroom factor (LHF)—may be used. The small headroom factor indicates a low amount of headroom available relative to the amount of headroom available for the large headroom factor. When the service level objective defines a maximum value, the small headroom factor is greater than the large headroom factor.

Another factor that can be considered is a violation factor (LVF). The violation factor is a scalar that is used to multiply the soft level limit. If the service level objective defines a maximum value, the violation factor is typically greater than one, e.g., 1.1, 1.2, etc.

The factors are mirrored when the service level objective defines a minimum value. To summarize, for a service level objective that is a maximum value, the soft latency limit is based on a multiplier that is less than one, and the small headroom factor, large headroom factor, and the violation factor are of the following relative magnitudes:

$$LVF>SHF>LHF$$

Conversely, when the service level objective is a minimum value, the soft latency limit is based on a multiplier that is greater than one, and the small headroom factor, large headroom factor, and the violation factor are of the following relative magnitudes:

$$LVF<SHF<LHF$$

The state diagram 400 is described with reference to a service level objective that is a maximum value. For a service level objective that is a minimum value, the relations of the values are reversed.

The device collects instantaneous readings of the current service level and determines, from prior readings, a central tendency of the current service level. An example is a 30 second running average. This running average AVG_CLS is compared to the service level objective and, if the running average exceeds the service level objective, a timer is set, and a large violation (LV) signal is generated, which causes the server to operate at maximum power.

The device transitions to the SLO Violation State 406, and the time continues until expiration 424, at which time the device returns to the dynamic mode state. The timer is continually reset as long as the running average AVG_CLS continues to exceed the service level objective.

Another state transition occurs when a load on a processing device performing the service is greater than a threshold level of a maximum load value (Max Load*ML %). This causes the generation of the large violation signal and the device transitions to the High Load State 404. When the load falls below the maximum load value, the device reverts back to the dynamic mode state 402.

During the dynamic mode state 402, the device may generate controls signals to adjust the power in a server depending on the value of the current service level as compared to the various thresholds. These are represented by events 410, 412, 414 and 416.

Event 410 occurs when the current service level is greater than the soft level limit, but less than the soft level limit multiplied by the violation factor, i.e., SLL<CSL<SLL*LVF. This is indicative of performance of the server 202 approaching the service level objective value for the sample reading. However, because this is based on one reading and not time averaged, transition to the violation state 406 is not triggered. Instead, a minor remediation is attempted, as is indicated by the generation of the small violation signal (SV). Processing of the small violation signal is described with reference to FIG. 5 below.

Event 412 occurs when the current service level is greater than the soft level limit multiplied by the violation factor, i.e., CSL>SLL*LVF. This is indicative of performance of the server 202 approaching or even exceeding the service level objective value for the sample reading. However, because this again is based on one reading and not time averaged, transition to the violation state 406 is not triggered. Instead, a moderate remediation is attempted, as is indicated by the generation of the large violation signal. Processing of the large violation signal is described with reference to FIG. 5 below.

Event 414 occurs when the current service level is greater than the soft level limit multiplied by large headroom factor, but less than the soft level limit multiplied by the small headroom factor, i.e., SLL*LHF<CSL<SLL*SHF. This indicates there is room available to reduce power to the server, albeit in a small increment. In response, a small headroom (SH) signal is generated. Processing of the small headroom signal is described with reference to FIG. 5 below.

Event 416 occurs when the current service level is less than the soft level limit multiplied by large headroom factor, CSL<SLL*LHF. This indicates there is significant room available to reduce power to the server, and in a larger increment than when there is only small headroom available. In response, a large headroom (LH) signal is generated. Processing of the large headroom signal is described with reference to FIG. 5 below.

The use of thresholding described above is just one example way by which various control signals can be generated. Other appropriate control methodologies appropriate for determining when to generate particular signals can also be used.

Figure 5:
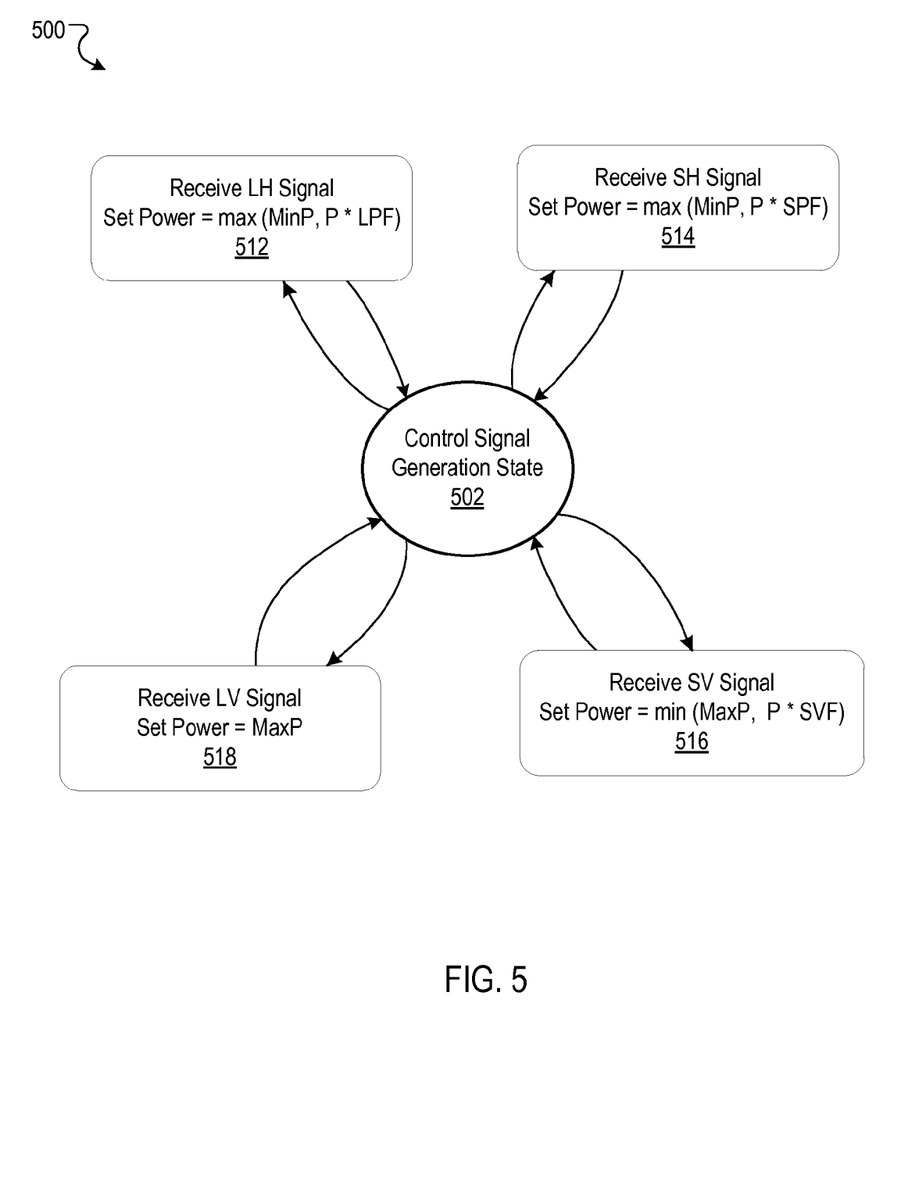
FIG. 5 is a state diagram illustrating example power adjustments responsive to the control signals.

FIG. 5 is a state diagram 500 illustrating power adjustments responsive to the control signals. A state machine implemented in a control device generates a corresponding power adjustment based on the control signal received. In the example shown, the state machine processes the four control signals generated above—the small violation (SV) signal, the large violation (LV) signal, the small headroom signal (SH), and the large headroom (LH) signal.

Event 512 occurs when the large headroom signal is received. The large headroom signal indicates a current performance level is significantly exceeding the service level objective (or scaled version of the service level objective), and thus power for the server 202 to which the signal corresponds may be reduced. Because the signal may be received for multiple iterations, however, reducing the power each time may result in reduction of power in a server 202 to a level below which the server 202 may operate without error. Accordingly, power is adjusted according to the following setting:

Set Power=max(Min$P,P*LPF$)

The value MinP is a minimum power level at which the server 202 may operate; the power level P is a current power level setting of the server 202; and the value LPF is a large power factor reduction value that is less than unity.

Event 514 occurs when the small headroom signal is received. The small headroom signal indicates a current performance level is exceeding the service level objective (or scaled version of the service level objective), and thus power for the server 202 to which the signal corresponds may be reduced. However, because the level at which the current performance level is exceeding the service level objective is less than that when the large headroom signal is received, power is reduced in a less aggressive manner according to the setting:

Set Power=max(Min$P,P*SPF$)

The value SPF is a small power factor reduction value that is less than unity, but greater than the large power factor reduction, i.e., $LPF<SPF<1.0$ Event 516 occurs when the small violation signal is received. As described above, this is indicative of performance of the server 202 approaching the service level objective value, and thus power may need to be increased to increase the service level of the server. However, because the current performance level is not exceeding the service level objective (or scaled version of the service level objective), a restoration to maximum power may not be necessary. Accordingly, power is adjusted according to the following setting:

Set Power=min(Max$P,P*SVF$)

The value MaxP is a maximum power level at which the server 202 may operate; the power level P is a current power level setting of the server 202; and the value SVF is a small violation factor increment value that is greater than unity.

Event 516 occurs when the large violation signal is received. As described above, this is indicative of performance of the server 202 approaching or exceeding the service level objective value, of a heavy load, or of the averaged service level of the server 202 exceeding the service level objective value. The server 202 is therefore set to a maximum power level.

Figure 6:
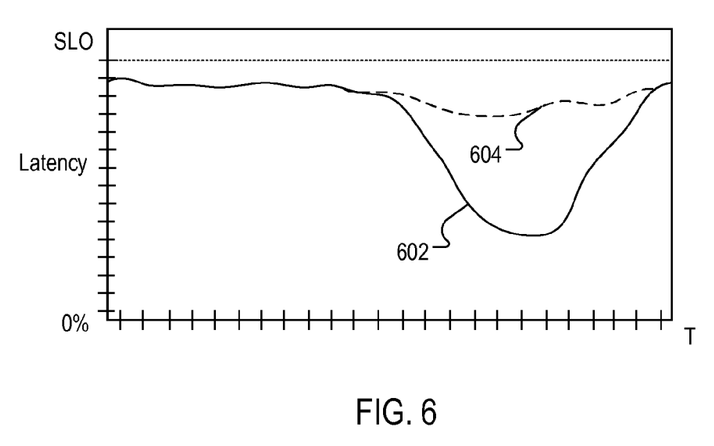
FIG. 6 depicts plots of latency over time for a service.
Figure 7:
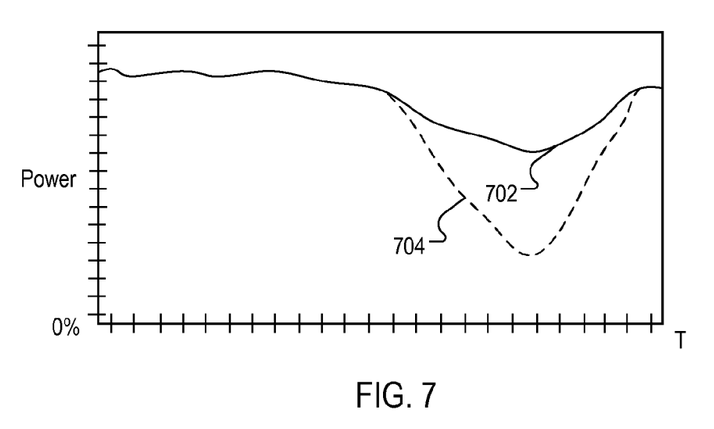
FIG. 7 depicts plots of power consumption over time for a service.

The power savings that can be realized by use of the dynamic service level objective control system is illustrated by FIGS. 6 and 7. In particular, FIG. 6 depicts plots of latency over time for a service, and FIG. 7 depicts plots of power consumption over time for a service. The solid lines correspond to a service run on a set of processing devices that are not controlled by a dynamic service level objective control system, while the dashed lines correspond to the same service run on a set of processing devices that are controlled by a dynamic service level objective control system.

The solid line 602 in FIG. 6 depicts an overall latency for a service. The overall latency is below the service level objective SLO; however, during a particular time period the latency decreases drastically, as indicated by the dip in the curve. This can be due to an off peak time period, for example. Additionally, in FIG. 7, the power level 702 decreases accordingly.

The solid line 604 in FIG. 6 also depicts an overall latency for the service. However, during the particular time the latency decreases much less than as indicated by the line 602. However, in FIG. 7, the power level 704 decreases much more than the power level 702. This is because power levels in the individual servers 202 were reduced to conserve power at the expense of increased latency. However, because the overall latency still met the service level objectives, the user experience is not impacted. Thus, a significant cost savings can be achieved without impacting the user experience.

Figure 8:
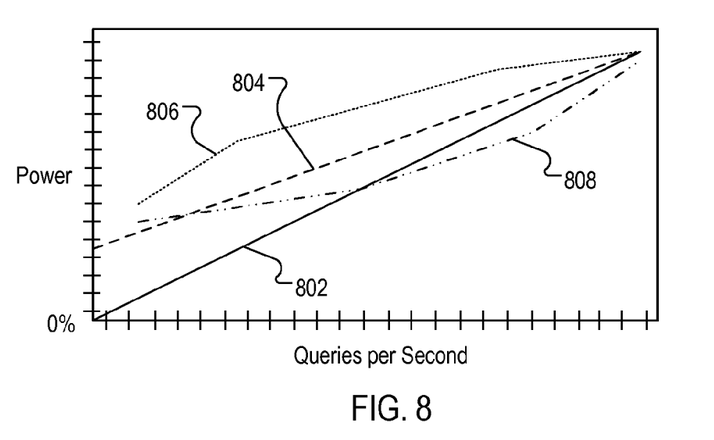
FIG. 8 depicts plots of power consumption over a service load for a service.

FIG. 8 depicts plots of power consumption over a service load for a service. Line 802 represents an ideal straight line curve of power versus load (e.g., processing queries per second). Line 804 represents the idealized curve 802 adjusted by idle power consumption. Line 806 represents power consumption in a set of servers that are not controlled by a dynamic service level objective control system. Finally, line 808 represents power consumption in a set of servers that are controlled by a dynamic service level objective control system.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

While this specification contains many specific implementation details, these should not be construed as limitations on the scope of any inventions or of what may be claimed, but rather as example descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed only in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   for each of a plurality of services that are each distributively implemented in a respective set of processing devices, each processing device being a server computer and the set of processing devices including a plurality of server computers in which the service is distributively implemented, each service having a respectively associated service level objective value for the service, the service level objective value being a required quality of service to be met by the set of processing devices performing the service, determining a current service level value that measures a current performance of the service by the set of processing devices performing the service;
   for each service for which the current service level value does not meet the service level objective value of the service, generating a first control signal that causes one or more of the processing devices performing the service to operate at a first power consumption level; and
   for each service for which the current service level value does meet the service level objective value of the service, generating one or more control signals that cause one or more processing devices performing the service to operate at one or more reduced power consumption levels that are each less than the first power consumption level and wherein the one or more reduced power consumption levels causes a decrease in the current performance by the set of processing devices performing the service so that a difference between the current service level value of the set of processing devices performing the service and the service level objective value for the service decreases.

2. The computer-implemented method of claim 1, wherein generating one or more control signals that cause one or more processing devices performing the service to operate at one or more reduced power consumption levels comprises:
  determining a difference between the current service level value and the service level objective value;
  determining a control signal that causes a power consumption level in a processing device to be reduced in proportion to difference between the current service level value and the service level objective value.

3. The computer-implemented method of claim 1, wherein generating one or more control signals that cause one or more processing devices performing the service to operate at one or more reduced power consumption levels comprises:
  for each service, comparing the current service level value set of threshold values, each threshold value based on a scalar of the service level objective value of the service;
  for each service for which the current service level value does not meet a first threshold value that is less than the service level objective value and does meet the service level objective value, generating the first control signal; and
  for each service for which the current service level value does meet a second threshold value that is less than the first threshold value, and does meet the first threshold value, generating a second control signal that cause one or more processing devices performing the service to operate between a maximum power level and a first reduced power level.

4. The computer-implemented method of claim 3, further comprising:
  for each service for which the current service level value does not meet a third threshold value that is less than the second threshold value, and does meet the second threshold value, generating a third control signal that cause one or more processing devices performing the service to operate between a minimum power level and a second reduced power level, the second reduced power level being less than the first reduced power level.

5. The computer-implemented method of claim 4, further comprising:
  for each service for which the current service level value does meet the third threshold value generating a fourth control signal that cause one or more processing devices performing the service to operate between a minimum power level and a third reduced power level, the third reduced power level being less than the second reduced power level.

6. The computer-implemented method of claim 1, wherein for each service for which a load on the set of processing devices performing the service is greater than a threshold level of a maximum load value, generating the first control signal that causes the processing devices performing the service to operate at the first power consumption level.

7. The computer-implemented method of claim 1, wherein:
  each processing device performing a service has an associated constituent service level objective value that defines a constituent quality of service to be met by the processing device performing the service;
  determining a current service level value that measures a current performance of the service by the set of processing devices performing the service comprises determining a constituent current service level value for each processor performing the service;
  generating one or more control signals that cause one or more processing devices performing the service to operate at one or more reduced power consumption levels comprises:
    for each processor, determining a difference between the constituent current service level value and the constituent service level objective value; and
    determining a control signal that causes a power consumption level in a processing device to be reduced in proportion to difference between the current service level value and the service level objective value.

8. The computer-implemented method of claim 1, wherein one of the services is a search service, and the service level objective is a query serving latency time.

9. A computer-implemented method, comprising:
  for a service that is distributively implemented in a set of processing devices, each processing device being a server computer and the set of processing devices including a plurality of server computers in which the service is distributively implemented, the service having a respectively associated service level objective value, the service level objective value being a required quality of service to be met by the set of processing devices performing the service, determining a current service level value that measures a current performance of the service by the set of processing devices performing the service;
  when the current service level value does not meet the service level objective value of the service, generating a first control signal that causes one or more of the processing devices performing the service to operate at a first power consumption level; and
  when the current service level value does meet the service level objective value of the service, generating one or more control signals that cause one or more processing devices performing the service to operate at one or more reduced power consumption levels that are each less than the first power consumption level and wherein the one or more reduced power consumption levels causes a decrease in the current performance by the set of processing devices performing the service so that a difference between the current service level value of the set of processing devices performing the service and the service level objective value for the service decreases.

10. A system comprising:
  a set of processing devices configured to distributively implement a service, each processing device being a server computer and the set of processing devices including a plurality of server computers in which the service is distributed implemented, the service having a respectively associated service level objective value, the service level objective value being a required quality of service to be met by the set of processing devices performing the service, each processing device including a node controller configured to:
    determine a constituent current service level value that measures a current performance of the service by the processing device;
    when the constituent current service level value does not meet a constituent service level objective value for the processing device, generate a first control signal that causes the processing device to operate at a first power consumption level; and when the constituent current service level value does meet the constituent service level objective value, generate one of a plurality of control signals that cause the processing device to operate at one of a plurality of reduced power consumption levels that are each less than the first power consumption level and wherein each reduced power consumption levels causes a current performance by processing device performing the service to decrease so that a difference between the constituent current service level value and the constituent service level objective value decreases;

wherein each constituent service level objective value is based on the service level objective.

11. The system of claim 10, further comprising:
a performance controller in data communication with the node controllers and configured to receive a service level objective for the service and determine, for each node controller, a constituent current service level value for the processing device in which the node controller is located, and provide the constituent current service level value to the node controller.

12. The system of claim 10, wherein generate one of a plurality of control signals comprises:
determining a difference between the constituent current service level value and the constituent service level objective value;
determining a control signal that causes a power consumption level in the processing device to be reduced in proportion to difference between the constituent current service level value and the constituent service level objective value.

13. The system of claim 10, wherein generate one of a plurality of control signals comprises:
comparing the constituent current service level value set of threshold values, each threshold value based on a scalar of the constituent service level objective value of the service;
when the constituent current service level value does not meet a first threshold value that is less than the constituent service level objective value and does meet the constituent service level objective value, generating the first control signal; and
when the constituent current service level value does meet a second threshold value that is less than the first threshold value, and does meet the first threshold value, generating a second control signal that causes the processing device to operate between a maximum power level and a first reduced power level.

14. A computer storage apparatus including a computer readable medium encoded with instructions that when executed by a data processing apparatus cause the data processing apparatus to perform operations comprising:
for each of a plurality of services that are each distributively implemented in a respective set of processing devices, each processing device being a server computer and the set of processing devices including a plurality of server computers in which the service is distributively implemented, each service having a respectively associated service level objective value for the service, the service level objective value being a required quality of service to be met by the set of processing devices performing the service, determining a current service level value that measures a current performance of the service by the set of processing devices performing the service;

for each service for which the current service level value does not meet the service level objective value of the service, generating a first control signal that causes one or more of the processing devices performing the service to operate at a first power consumption level; and for each service for which the current service level value does meet the service level objective value of the service, generating one or more control signals that cause one or more processing devices performing the service to operate at one or more reduced power consumption levels that are each less than the first power consumption level and wherein the one or more reduced power consumption levels causes a decrease in the current performance by the set of processing devices performing the service so that a difference between the current service level value of the set of processing devices performing the service and the service level objective value for the service decreases.

15. The computer storage apparatus of claim 14, wherein generating one or more control signals that cause one or more processing devices performing the service to operate at one or more reduced power consumption levels comprises:
determining a difference between the current service level value and the service level objective value;
determining a control signal that causes a power consumption level in a processing device to be reduced in proportion to difference between the current service level value and the service level objective value.

16. The computer storage apparatus of claim 14, wherein generating one or more control signals that cause one or more processing devices performing the service to operate at one or more reduced power consumption levels comprises:
for each service, comparing the current service level value set of threshold values, each threshold value based on a scalar of the service level objective value of the service;
for each service for which the current service level value does not meet a first threshold value that is less than the service level objective value and does meet the service level objective value, generating the first control signal; and
for each service for which the current service level value does meet a second threshold value that is less than the first threshold value, and does meet the first threshold value, generating a second control signal that cause one or more processing devices performing the service to operate between a maximum power level and a first reduced power level.

17. A method implemented in one or more computers, comprising:
in each processing device in a set of processing devices distributively implementing a service, the service having a respectively associated service level objective value, each processing device being a server computer and the set of processing devices including a plurality of server computers in which the service is distributively implemented, the service level objective value being a required quality of service to be met by the set of processing devices performing the service:
determining a constituent current service level value that measures a current performance of the service by the processing device;

when the constituent current service level value does not meet a constituent service level objective value for the processing device, generating a first control signal that causes the processing device to operate at a first power consumption level; and when the constituent current service level value does meet the constituent service level objective value, generating one of a plurality of control signals that cause the processing device too operate at one of a plurality of reduced power consumption levels that are each less than the first power consumption level and wherein each reduced power consumption levels causes a decrease in the current performance of the service so that a difference between the constituent current service level value and the constituent service level objective value decreases;

wherein each constituent service level objective value is based on the service level objective.

18. The method of claim 17, further comprising:

in a data processing apparatus, receiving a service level objective for the service and determining, for each processing device, a constituent current service level value for the processing device, and provide the constituent current service level value to the processing device.

19. The method of claim 17, wherein generate one of a plurality of control signals comprises:

determining a difference between the constituent current service level value and the constituent service level objective value;

determining a control signal that causes a power consumption level in the processing device to be reduced in proportion to difference between the constituent current service level value and the constituent service level objective value.

* * * * *